(12) United States Patent
Tanaka

(10) Patent No.: US 6,765,626 B1
(45) Date of Patent: Jul. 20, 2004

(54) DIGITAL TELEVISION SIGNAL RECEIVING UNIT WITH SIMPLIFIED STRUCTURE AND LOWERED INFLUENCE TO UNIT GENERATED NOISE

(75) Inventor: Ryouichi Tanaka, Fukushima-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 429 days.

(21) Appl. No.: 09/707,646

(22) Filed: Nov. 7, 2000

(30) Foreign Application Priority Data

Nov. 8, 1999 (JP) .......................................... 11-316357

(51) Int. Cl.$^7$ .............................. H04N 5/44; H04N 5/50
(52) U.S. Cl. ....................... 348/725; 348/731; 348/726; 455/301
(58) Field of Search .............................. 348/725, 726, 348/727, 728, 731, 818, 819, 820; 455/300, 301; H04N 5/44, 5/50

(56) References Cited

U.S. PATENT DOCUMENTS 5,355,532 A * 10/1994 Kubo et al. ................. 455/301
5,602,835 A * 2/1997 Seki et al. ................... 370/206
5,761,190 A * 6/1998 Yamauchi et al. .......... 370/210
5,974,095 A * 10/1999 Kitaura et al. .............. 455/301
6,400,419 B1 * 6/2002 Yamamoto .................. 348/731

FOREIGN PATENT DOCUMENTS

JP        2000-165764        6/2000

* cited by examiner

Primary Examiner—Sherrie Hsia
(74) Attorney, Agent, or Firm—Brinks Hofer Gilson & Lione

(57) ABSTRACT

The cost of a receiving unit is reduced by simplifying its structure and the receiving unit structure further reduces the unit from being influenced by noises and the like generated by the main body of the television receiver. A digital television signal receiving unit includes of a metallic case, a frequency conversion circuit housed in the metallic case for converting a frequency of a received digital television signal into an intermediate frequency signal or a base band signal and an OFDM signal processing circuit for processing either the intermediate frequency signal or the base band signal and outputting an MPEG bit stream signal. Operations of the frequency conversion circuit and the signal processing circuit are controlled by a control signal outputted from a control circuit arranged outside the metallic case.

5 Claims, 4 Drawing Sheets

DIGITAL TELEVISION SIGNAL RECEIVING UNIT WITH SIMPLIFIED STRUCTURE AND LOWERED INFLUENCE TO UNIT GENERATED NOISE

BACKGROUND OF THE INVENTION

1. Field of the Invention

This invention relates to a digital television signal receiving unit (hereinafter merely called a receiving unit) that is preferable for receiving a digital type television signal transmitted by a ground wave.

2. Description of the Related Art

FIG. 4 illustrates a block arrangement of a related art receiving unit, wherein the receiving unit consists of a tuner section 31, an OFDM demodulation circuit section 32, a Fourier transform circuit section 33, an error correction circuit section 34, a control circuit section 35, a connector 36 having a plurality of contact elements and a crystal oscillator 37 and the like are mounted on a printed circuit board 41.

In this case, the tuner section 31 has a rectangular parallelpiped metallic case 31a and it is constructed such that a frequency conversion circuit and an A/D conversion circuit and the like (both of them are not shown) are mounted on a printed circuit board (not shown) housed in the metallic case 31a. Then, an input connector 31b receiving the television signal is fixed at the side surface under a state in which it is protruded in a longitudinal direction of the metallic case 31a and further the metallic case 31a has a plurality of terminals 31c protruded from the other side surface.

In this case, the OFDM demodulation circuit section 32, the Fourier transform circuit section 33, the error correction circuit 34 and the control circuit section 35 is formed into one integrated circuit chip and each of them is constructed as its individual package.

The printed circuit board 41 consists of by a rectangular multilayer substrate. The tuner section 31 is mounted on the printed circuit board 41 in such a way that the input connector 31b is protruded out of the end section 41a of the printed circuit board 41. A plurality of terminals 31c protruded out of the side surface of the tuner section 31 are bent at a right angle and inserted into the printed circuit board 41. In addition, the OFDM demodulation circuit section 32 and the Fourier transform circuit section 33 are arranged in sequence on the same lines arranged in the longitudinal direction of the tuner section 31, the tuner section 31 and the OFDM demodulation circuit section 32 are mounted in such that they are near to each other and the OFDM demodulation circuit section 32 and the Fourier transform circuit section 33 are also mounted in such that they are near to each other.

The error correction circuit section 34 oppositely faces against the OFDM demodulation circuit section 32, the control circuit section 35 faces oppositely against the Fourier transform circuit 33 and are mounted such that they are positioned in parallel near the arrangement of the OFDM demodulation circuit section 32 and the Fourier transform circuit section 33. Then, a crystal oscillator 37 is mounted between the error correction circuit section 34 and the control circuit section 35.

Further, the connector 36, having a plurality of connecting elements, is mounted in opposition to the terminals 31c of the tuner section 31.

Then, the terminals 31c of the tuner section 31 and each of the terminals (not shown) of the OFDM demodulation circuit section 32, the Fourier transform circuit section 33, the error correction circuit section 34 and the control circuit 35 and the like is soldered to a predetermined conductive pattern (not shown) arranged on the printed circuit board 41 and connected to each other and connected to the contact elements (not shown) of the connector 36. Then, various kinds of signals are generated by or received from the main body of the television receiver set through the connector 36.

The tuner section 31 includes the frequency conversion circuit and the A/D conversion circuit, wherein a television signal of a tuned channel is converted into an intermediate frequency signal by the frequency conversion circuit, and the A/D conversion circuit may output a digital signal generated by sampling the intermediate frequency signal to the OFDM demodulation circuit section 32.

In this arrangement, the printed circuit board 41 is provided with a conductive pattern (not shown), the terminals 31c of the tuner section 31 are connected to the OFDM demodulation circuit section 32 through this conductive pattern, the OFDM circuit section 32 and the Fourier transform circuit section 33 are connected to each other, and the OFDM demodulation circuit section 32 and the error correction circuit section 34 are connected to each other to transmit the aforesaid signal in sequence.

The control circuit section 35 is a microcomputer, wherein it controls operations of the OFDM demodulation circuit section 32, the Fourier transform circuit section 33 and the error correction circuit section 34 in response to a control signal (that includes a tuning signal) sent from the main body of the television receiver (not shown) and further controls a tuning operation of the tuner section 31.

Due to this fact, the control circuit section 35 and the terminals 31c; the control circuit section 35 and the OFDM demodulation circuit 32; the control circuit section 35 and the error correction circuit section 34; and the control circuit section 35 and the Fourier transform circuit section 33 are connected to each other to generate or receive the aforesaid control signal.

Further, the crystal oscillator 37 is used for generating a synchronous signal in case where the control circuit section 35 controls the operations of the OFDM demodulation circuit section 32 and the error correction circuit section 34.

In the aforesaid receiving unit, since the tuner section 31 and the crystal oscillator 37 were fixed on the printed circuit board 41, its assembling work became a troublesome work and at the same time its cost was increased under application of either the printed circuit board 41 or the connector 36.

In addition, since the OFDM demodulation circuit section 32 to the error correction circuit section 34 were not shielded and mounted on the printed circuit board 41, noises such as synchronizing signals (a vertical synchronizing signal and a horizontal synchronizing signal and the like) outputted from the main body part of the television receiver were induced at each of these circuit sections to be overlapped on the MPEG bit stream signal. This caused the image quality or the like to deteriorate. In cases where a level of the synchronizing signal is further high, this state produces some problems that badly influences the operations of the OFDM demodulation circuit section 32 or the error correction circuit section 34 and a reproduction of the accurate image becomes impossible.

SUMMARY OF THE INVENTION

In view of the foregoing, the present invention decreases costs by simplifying receiver structure and minimizing units influence to noise generated by the main body of the television receiver.

A digital television signal receiving unit embodiment of the present invention comprises a metallic case, a frequency conversion circuit for converting a frequency of a received digital television signal into an intermediate frequency signal or a base band signal and an OFDM signal processing circuit for processing either the intermediate frequency signal or the base signal and outputting an MPEG bit stream signal, housed in the metallic case. Operations of the frequency conversion circuit and the signal processing circuit are controlled by a control signal outputted from a control circuit arranged outside the metallic case.

In addition, a digital television signal receiving unit embodiment according to the present invention includes an OFDM signal processing circuit comprised of an A/D conversion circuit for converting either the intermediate frequency signal or the base band signal into a digital signal and an OFMD demodulation circuit for OFDM demodulating the digital signal and outputting a demodulation signal. This embodiment further includes a Fourier transform circuit for Fourier-transforming the demodulation signal and an error correction circuit for correcting a bit error of the signal Fourier-transformed by the Fourier transform circuit and outputting the MPEG bit stream signal. Preferably, the OFDM demodulation circuit, the Fourier transform circuit and the error correction circuit are packaged or integrated within one integrated circuit chip. In addition, a digital television signal receiving unit embodiment of the present invention includes an A/D conversion circuit formed within the integrated circuit chip.

In addition, a digital television signal receiving unit embodiment according to the present invention includes a printed circuit board housed in the metallic case, the frequency conversion circuit and the integrated circuit are mounted on the printed circuit board, terminals for receiving the control signal and inputting it into the integrated circuit through a wiring conductive pattern arranged on the printed circuit board are fixed to one side surface of the metallic case, and the terminals are positioned between the mounting position of the frequency conversion circuit and the mounting position of the integrated circuit.

DESCRIPTION OF THE PREFERRED EMBODIMENT

Figure 2:
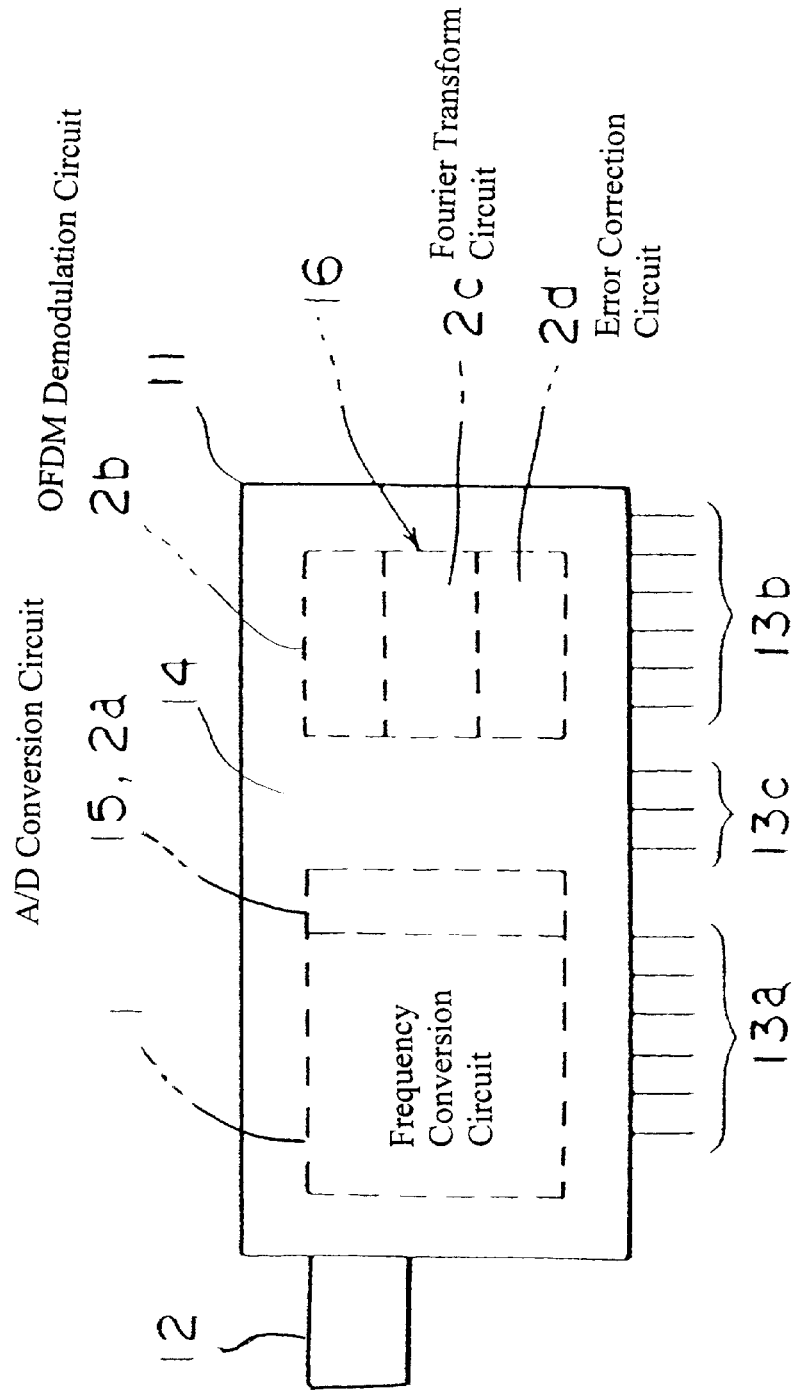
FIG. 2 is a block arrangement of a first preferred embodiment of a digital television signal receiving unit according to the present invention.
Figure 3:
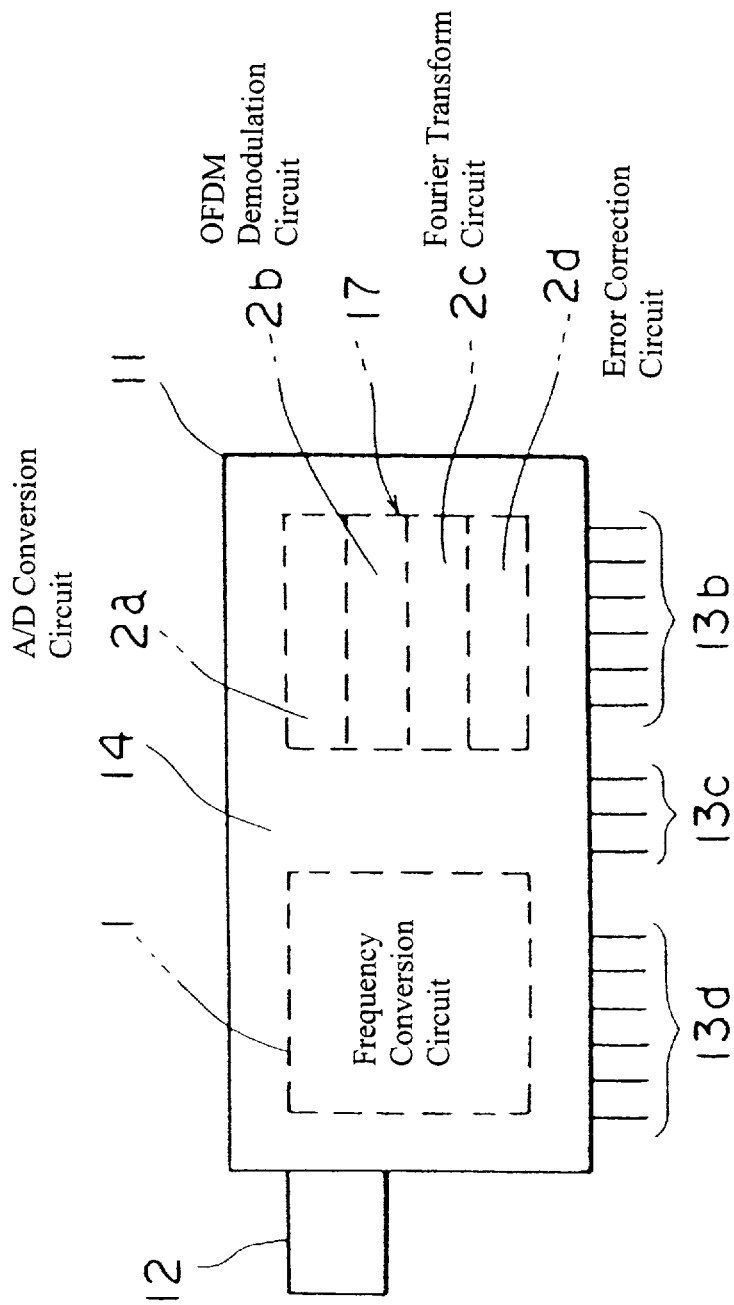
FIG. 3 is a block arrangement of a second preferred embodiment of a digital television signal receiving unit according to the present invention.
Figure 4:
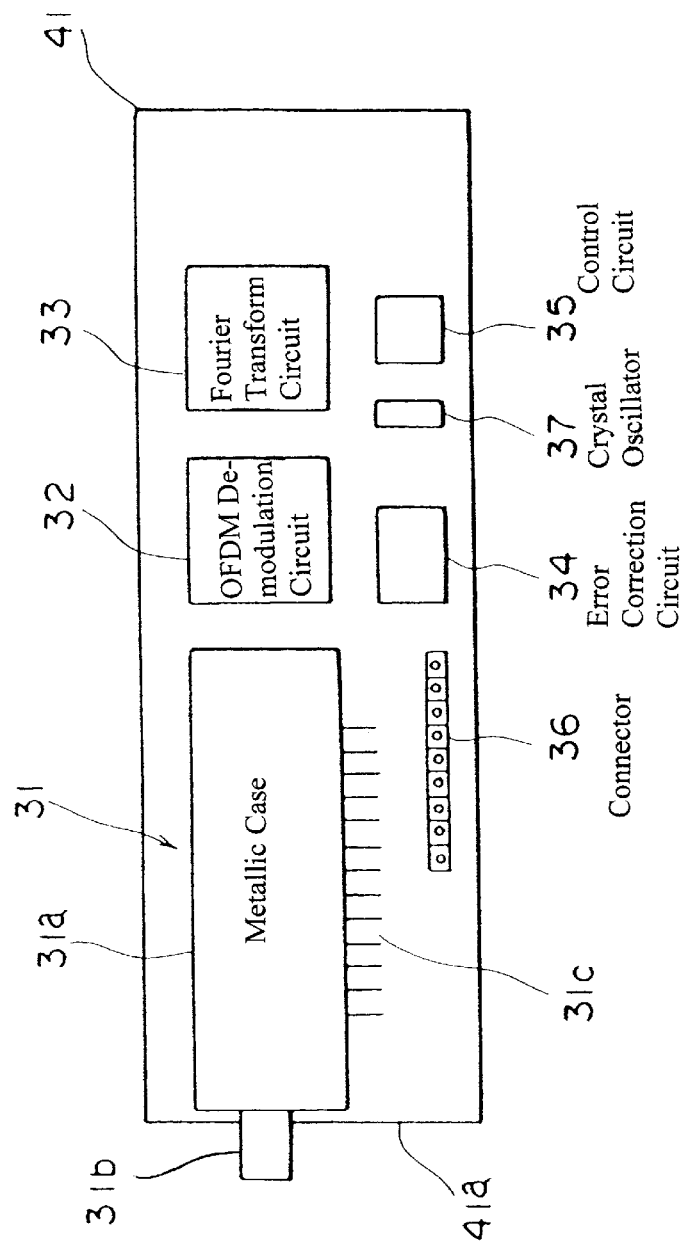
FIG. 4 is a block arrangement of the prior art digital television signal receiving unit.

Referring now to the drawings, the digital television signal receiving unit (hereinafter called as a receiving unit) according to the present invention will be described. In this case, FIG. 1 is a block diagram of the receiving unit of the present invention, FIG. 2 is a block diagram of a first preferred embodiment of the receiving unit of the present invention, and FIG. 3 is a block arrangement diagram of a second preferred embodiment of the receiving unit of the present invention.

Figure 1:
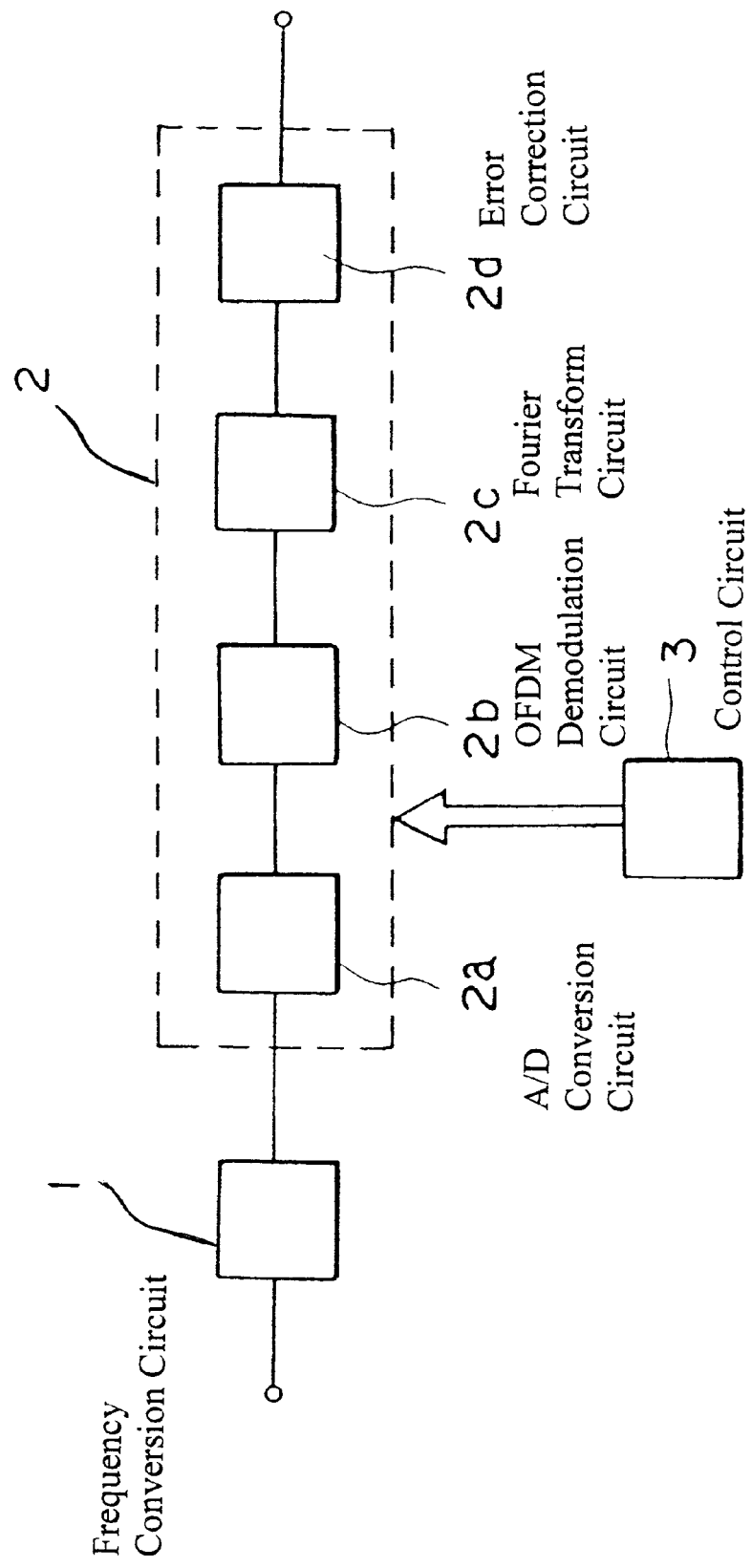
FIG. 1 is a block configuration of a digital television signal receiving unit according to the present invention.

At first, referring to FIG. 1, a block configuration of a receiving unit embodiment of the present invention. This receiving unit may be one that is used as an OFDM (orthogonal frequency division multiplex) system employed in Japan or Europe, for example, wherein it is comprised of a frequency conversion circuit 1 for frequency converting a tuned digital television signal into either an intermediate television frequency signal or a base band signal, and an OFDM signal processing circuit 2 for processing either an intermediate frequency signal or the base band signal and outputting an 8-bit MPEG bit stream signal.

In this embodiment, the frequency conversion circuit 1 corresponds to a high frequency circuit section where a mixer or a local oscillator and the like (not shown) are provided and it has a similar configuration as a frequency conversion circuit in an analog-type television tuner.

OFDM signal processing circuit 2 is comprised of an A/D conversion circuit 2a, an OFDM demodulation circuit 2b, a Fourier transform circuit 2c and an error correction circuit 2d.

Then, a tuning operation of the frequency conversion circuit 1 or an operation in each of the circuits in the OFDM signal processing circuit 2 is controlled by a control circuit 3 such as a microcomputer or the like arranged in the main body of the television receiver not shown.

Then, either the intermediate frequency or base band signal frequency converted by the frequency conversion circuit 1 is converted into a digital signal by the A/D conversion circuit 2a, the digital signal is demodulated by the OFDM demodulation circuit 2b, the demodulated signal is Fourier-transformed by the Fourier transform circuit 2c, its bit error is corrected by the error correction circuit 2d and the signal is converted into an MPEG bit stream signal. The MPEG bit stream signal is processed by a processing circuit (not shown) in the television receiver.

Further, the entire assembly of the PFDM demodulation circuit 2b, the Fourier transform circuit 2c and the error correction circuit 2d may be referred to as a channel decoder.

As shown in FIG. 2, the aforesaid frequency conversion circuit 1 and the OFDM signal processing circuit 2 are housed in a rectangular frame-like metallic case 11. To the adjoining side surface of the metallic case 11 are fixed an input connector 12 for inputting each of the digital television signals and a plurality of terminals 13a–13c. In addition, a printed circuit board 14 is housed in the metallic case 11, and each of the input connector 12 and the plurality of terminals 13a–13c is connected to the wiring conductive pattern (not shown) formed on the printed circuit board 14. Then, the frequency conversion circuit 1, the A/D conversion circuit 2a, the OFDM demodulation circuit 2b, the Fourier transform circuit 2c and the error correction circuit 2d are mounted on the printed circuit board 14, and they are covered by a metallic cover (not shown) fixed to the metallic case 11.

In this embodiment, the A/D conversion circuit 2a to the error correction circuit 2d are formed into an integrated circuit, wherein the A/D conversion circuit 2a is formed in the one integrated circuit chip 15 and a channel decoder comprised of the OFDM demodulation circuit 2b, the Fourier transform circuit 2c and the error correction circuit 2d is also formed in one integrated circuit chip 16. Accordingly, the OFDM demodulation circuit 2b, the Fourier transform circuit 2c and the error correction circuit 2d are connected to each other within the integrated circuit 16.

Then, the frequency conversion circuit 1, the integrated circuit 15 and the integrated circuit 16 are mounted in this order on the printed circuit board 14 from the side where the input connector 12 is fixed.

Terminals 13a–13c fixed to the side surface of the metallic case 11 are used for inserting the receiving unit into the mother board (not shown) in the main body of the television receiver and for connecting it. The terminals 13a are fixed in correspondence with the mounting position of the mounted frequency conversion circuit 1, the terminals 13b are fixed in correspondence with the mounting position of the integrated circuit 16 and the terminals 13c are also fixed at the corresponding side surface between the mounting positions of the frequency conversion circuit 1 and the integrated circuit 16, respectively.

Power supply voltage supplied from the mother board and the like are supplied to the frequency conversion circuit 1 through the terminals 13a. MPEG bit stream signal outputted from the error correction circuit 2d within the integrated circuit 16 is sent to the mother printed circuit board through the terminals 13b. In addition, the control signal produced from the control circuit 3 is supplied to the integrated circuits 15 and 16 through the terminals 13c. In addition, the frequency conversion circuit 1 is controlled via the integrated circuit 16. Accordingly, as described above, a wiring conductive pattern for use in connecting the terminals 13a–13c with each of the circuits is formed on the printed circuit board 14.

As described above, since the frequency conversion circuit 1, the integrated circuit 15 comprising the A/D conversion circuit 2a, and the integrated circuit 16 constituting the OFDM demodulation circuit 2b, Fourier transform circuit 2c and error correction circuit 2d are housed in the metallic case 11, no problem occurs even when noises such as a synchronizing signal generated from the main body of the television receiver and the like are present.

In addition, since the OFDM demodulation circuit 2b, the Fourier transform circuit 2c and the error correction circuit 2d are formed in the integrated circuit 16, their relative connection is carried out within the integrated circuit 16 and it is not necessary to arrange the wiring conductive pattern for mutual connection on the printed circuit board 14. This reduces the size of the printed circuit board 14.

Further, since the terminals 13c for inputting the control signal are fixed to the side surface of the metallic case 11 between the mounting positions of the frequency conversion circuit 1 and the integrated circuit 16, resulting in that the wiring conductive pattern for supplying the control signal to the integrated circuits 15, 16 can be arranged between the mounting position of the frequency conversion circuit 1 and the mounting position of the integrated circuit 16. Thus, it is possible to prevent the wiring pattern from being crossed with another wiring conductive pattern. In particular, since it is satisfactory that it is not crossed with the wiring conductive pattern for outputting MPEG bit stream signal to the terminal 13b, resulting in that the interference between the signals is less and erroneous control is not likely to occur.

The receiving unit embodiment shown in FIG. 3 is constructed such that the A/D conversion circuit 2a is formed in the one integrated circuit chip 17 together with the OFDM demodulation circuit 2b, the Fourier transform circuit 2c and the error correction circuit 2d.

Then, the frequency conversion circuit 1 and the integrated circuit 17 are mounted on the printed circuit board 14 in sequence from the side where the input connector 12 is fixed. In this embodiment, the frequency conversion circuit 1 and the integrated circuit 17 are mounted slightly spaced apart from each other and the terminals 13c are positioned at the side surface between the mounting position of the frequency conversion circuit 1 and the integrated circuit 17.

In this preferred embodiment, since the A/D conversion circuit 2a is mounted in one integrated circuit chip 17 together with the OFDM demodulation circuit 2b, the Fourier transform circuit 2c and the error correction circuit 2d, the mutual connection of these four circuits occurs in the integrated circuit 17. Accordingly, the wiring conductive pattern for mutual connection is reduced and it becomes possible to fabricate a smaller printed circuit board 14.

As described above, a digital television signal receiving unit embodiment of the present invention is constructed such that a frequency conversion circuit for converting a frequency of a received digital television signal into an intermediate frequency signal or a base band signal and an OFDM signal processing circuit for processing either the intermediate frequency signal or the base band signal and outputting an MPEG bit stream signal are housed in a metallic case. Operations of the frequency conversion circuit and the signal processing circuit are controlled by a control signal outputted from a control circuit arranged outside the metallic case. Even if noises of the synchronizing signal occur or the like generated from the main body of the television receiver, the noises are not transferred to these circuits, therefore eliminating some problems such as a malfunction of a television receiver due to noise.

A digital television signal receiving unit according to the present invention is constructed such that the OFDM signal processing circuit 2 is comprised of an A/D conversion circuit 2a for converting either an intermediate frequency signal or a base band signal into a digital signal, an OFMD demodulation circuit 2b for OFDM demodulating the digital signal and outputting the demodulation signal, a Fourier transform circuit 2c for Fourier-transforming the demodulation signal and an error correction circuit 2d for correcting a bit error of the signal Fourier-transformed by the Fourier transform circuit and outputting the MPEG bit stream signal. At least the OFDM demodulation circuit 2, the Fourier transform circuit 2c and the error correction circuit 2d are formed in one integrated circuit chip, so that their mutual connection can be carried out in the integrated circuit. Accordingly, it is not necessary to arrange the wiring conductive pattern for mutual connection on the printed circuit board where the frequency conversion circuit or the integrated circuit is mounted and so it is possible to reduce the size of the printed circuit board.

A digital television signal receiving unit embodiment according to the present invention is constructed such that the A/D conversion circuit 2a is formed within an integrated circuit 17, so that the mutual connection of these four circuits can be carried out in the integrated circuit. Accordingly, it becomes unnecessary to provide the wiring conductive pattern for the mutual connection and it is possible to reduce the size of the printed circuit board more.

In addition, a digital television signal receiving unit embodiment of the present invention is constructed such that the printed circuit board 14 is housed in the metallic case 11, the frequency conversion circuit 1 and the integrated circuit 16 are mounted on the printed circuit board 14, the terminals for receiving the control signal 13c and inputting it into the integrated circuit 16 through the wiring conductive pattern arranged on the printed circuit board are fixed at one side surface of the metallic case 11 and the terminal are positioned between the mounting position of the frequency conversion circuit 1 and the mounting position of the integrated circuit 16, so that it is possible to mount a wiring conductive pattern for supplying the control signal to the integrated circuit 16 between the mounting position of the frequency conversion circuit 1 and the mounting circuit of the integrated circuit 16. Due to this fact, the wiring conductive pattern is possible to prevent it from being crossed with another wiring conductive pattern. In particular, since it is satisfactory that the pattern may not be crossed with the wiring conductive pattern for outputting the MPEG bit stream signal to the terminals, interference between the signals is less and an erroneous control is less likely to occur.

What is claimed is:

1. A digital television signal receiving unit comprising a metallic case, a frequency conversion circuit for converting a frequency of a received digital television signal into an intermediate frequency signal or a base band signal and an OFDM signal processing circuit for processing either the intermediate frequency signal or the base band signal and outputting an MPEG bit stream signal, housed in the metallic case, wherein operations of the frequency conversion circuit and the signal processing circuit are controlled by a control signal outputted from a control circuit arranged outside the metallic case.

2. A digital television signal receiving unit according to claim 1, wherein the OFDM signal processing circuit is comprised of an A/D conversion circuit for converting either the intermediate frequency signal or the base band signal into a digital signal, an OFMD demodulation circuit for OFDM demodulating the digital signal and outputting a demodulation signal, a Fourier transform circuit for Fourier-transforming the demodulation signal and an error correction circuit for correcting a bit error of the signal Fourier-transformed by the Fourier transform circuit and outputting the MPEG bit stream signal, and at least the OFDM demodulation circuit, the Fourier transform circuit and the error correction circuit are constituted in one integrated circuit chip.

3. A digital television signal receiving unit according to claim 2, wherein the A/D conversion circuit is constituted within the integrated circuit.

4. A digital television signal receiving unit according to claim 2, wherein a printed circuit board is housed in the metallic case, the frequency conversion circuit and the integrated circuit are mounted on the printed circuit board, terminals for receiving the control signal and inputting it into the integrated circuit through a wiring conductive pattern arranged on the printed circuit board are fixed to one side surface of the metallic case, and the terminals are positioned between the mounting position of the frequency conversion circuit and the mounting position of the integrated circuit.

5. A digital television signal receiving unit according to claim 3, wherein a printed circuit board is housed in the metallic case, the frequency conversion circuit and the integrated circuit are mounted on the printed circuit board, terminals for receiving the control signal and inputting it into the integrated circuit through a wiring conductive pattern arranged on the printed circuit board are fixed to one side surface of the metallic case, and the terminals are positioned between the mounting position of the frequency conversion circuit and the mounting position of the integrated circuit.

\* \* \* \* \*

UNITED STATES PATENT AND TRADEMARK OFFICE
CERTIFICATE OF CORRECTION

PATENT NO. : 6,765,626 B1
DATED : July 20, 2004
INVENTOR(S) : Tanaka

It is certified that error appears in the above-identified patent and that said Letters Patent is hereby corrected as shown below:

Column 7,
Line 12, after "band signal" insert -- , -- (comma).
Line 15, after "stream signal," insert -- wherein each circuit is --.
Line 16, before "wherein operations" insert -- and --.
Line 27, after "demodulation signal" insert -- , -- (comma).
Line 28, after "error of" delete "the" and substitute -- a --.
Line 31, before "the Fourier" insert -- wherein --.

Column 8,
Line 6, after "integrated" delete "circuit." and substitute -- circuit chip. --.
Lines 10, 12, 21 and 23, after "integrated circuit" insert -- chip --.
Lines 13 and 24, after "are fixed to" delete "one" and substitute -- a --.
Lines 14 and 25, after "metallic case," delete "and" and substitute -- wherein --.
Lines 17 and 28, delete "circuit." and substitute -- circuit chip. --.

Signed and Sealed this

Twenty-seventh Day of December, 2005

JON W. DUDAS
*Director of the United States Patent and Trademark Office*